Dec. 7, 1965   F. A. GROTH ETAL   3,221,472
PACKAGING MACHINE
Filed Nov. 24, 1961   8 Sheets-Sheet 1

INVENTORS
Fred A. Groth
Paul Meisner
BY
Ooms, McDougall and Hersh
Attys

FIG. 4

INVENTORS
Fred A. Groth
Paul Meisner
BY
Ooms, McDougall and Hersh
Att'ys

Dec. 7, 1965    F. A. GROTH ETAL    3,221,472
PACKAGING MACHINE

Filed Nov. 24, 1961    8 Sheets-Sheet 3

INVENTORS
Fred A. Groth
Paul Meisner
BY
Dorns, McDougall and Hersh
Att'ys

INVENTORS
Fred A. Groth
Paul Meisner
BY Ooms, McDougall and Hersh
Att'ys

Dec. 7, 1965    F. A. GROTH ETAL    3,221,472
PACKAGING MACHINE
Filed Nov. 24, 1961    8 Sheets-Sheet 5

INVENTORS
Fred A. Groth
Paul Meisner
BY
Ooms, McDougall & Hersh
Attys

Dec. 7, 1965  F. A. GROTH ETAL  3,221,472
PACKAGING MACHINE
Filed Nov. 24, 1961  8 Sheets-Sheet 6

INVENTORS
Fred A. Groth
Paul Meisner
BY
Ooms, McDougall & Hersh
attys

Dec. 7, 1965 F. A. GROTH ETAL 3,221,472

PACKAGING MACHINE

Filed Nov. 24, 1961 8 Sheets-Sheet 7

INVENTORS
Fred A. Groth
Paul Meisner
BY
Ooms, McDougall & Hersh
Attys

United States Patent Office 3,221,472
Patented Dec. 7, 1965

3,221,472
PACKAGING MACHINE
Fred A. Groth, Chicago, and Paul Meisner, Park Forest,
Ill., assignors, by mesne assignments, to Dynamics
Corporation of America, a corporation of New York
Filed Nov. 24, 1961, Ser. No. 159,811
9 Claims. (Cl. 53—184)

This invention relates to a packaging machine adapted for automatic operation whereby a large variety of goods can be packaged efficiently and securely in a rapid fashion prior to distribution of the goods.

It is an object of this invention to provide a packaging machine which comprises a compact and streamlined unit and which is capable of packaging goods in an extremely rapid and highly secure manner.

It is a more particular object of this invention to provide a packaging machine which is adapted to receive material in sheet form, to form the sheet into a plurality of individual containers, to introduce the goods to be packaged into the containers, to securely seal the packages in a manner permitting simple opening of the containers, and finally, to separate and discharge the containers as individual packages.

It is a further object of this invention to provide a machine which is capable of accomplishing the foregoing packaging sequence in an extremely efficient manner and which is characterized by a rapid operation of high yield.

These and other objects of this invention will appear hereinafter and, for purposes of illustration, but not of limitation, specific embodiments of this invention are shown in the accompanying drawings in which.

*General description and operation*

Figure 1:
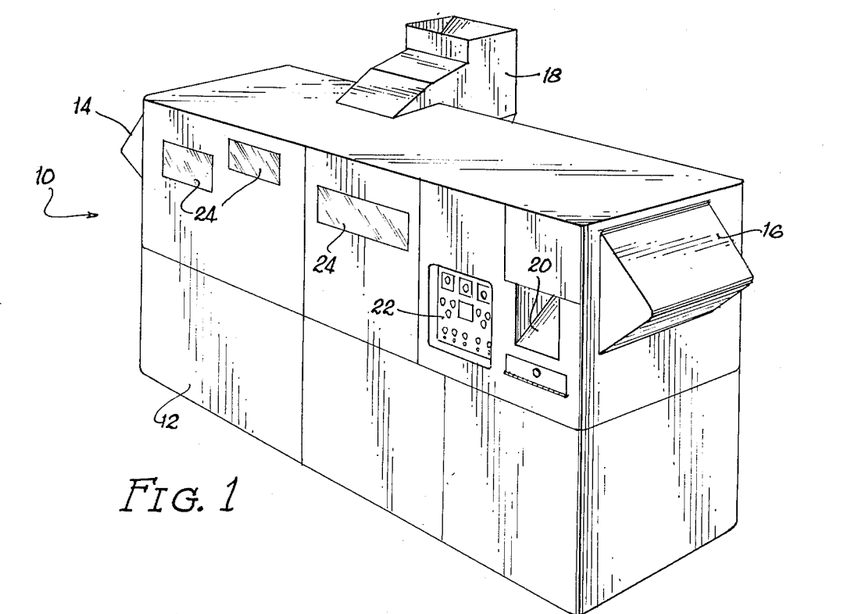
FIGURE 1 is a perspective view of the packaging machine as it appears when assembled into a compact unit.

The packaging machine 10 illustrated in FIGURE 1 includes a housing 12 containing the various operating parts employed in a packaging sequence. The housing is provided with protruding enclosures 14 and 16, the former housing a roll of plastic material employed in the cup forming operation and the latter housing scrap remnants produced in the operation. Also shown in FIGURE 1 is a hopper 18 accessible from outside the machine for loading the goods to be packaged. Exit chute 20 is provided for discharging the packaged goods. A control panel 22 is conveniently positioned in a side wall of the housing, and viewing windows 24 can likewise be provided.

Figure 2:
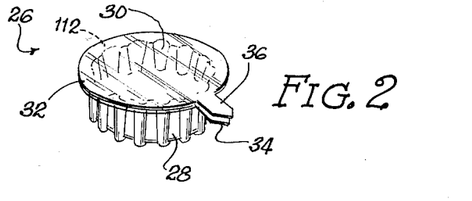
FIGURE 2 is a perspective view of an individual package of a design that can be provided with the machine of this invention.
Figure 3:
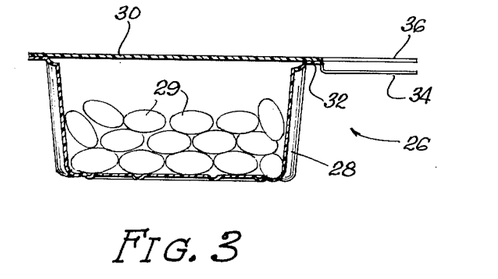
FIGURE 3 is an enlarged cross-sectional view of the package example shown in FIGURE 2.

FIGURES 2 and 3 illustrate one type of package adapted to be produced in the machine operation. The package includes a cup-like body 28 holding items 29. A closure 30 extends across the top of the body 28 and is sealed at its edges to the peripheral rim 32 of the cup. Extensions 34 and 36 are provided for the cup and closure, respectively. The tab extensions 34 and 36 are not sealed together and are adapted to provide for simple opening of the package.

Figure 4:
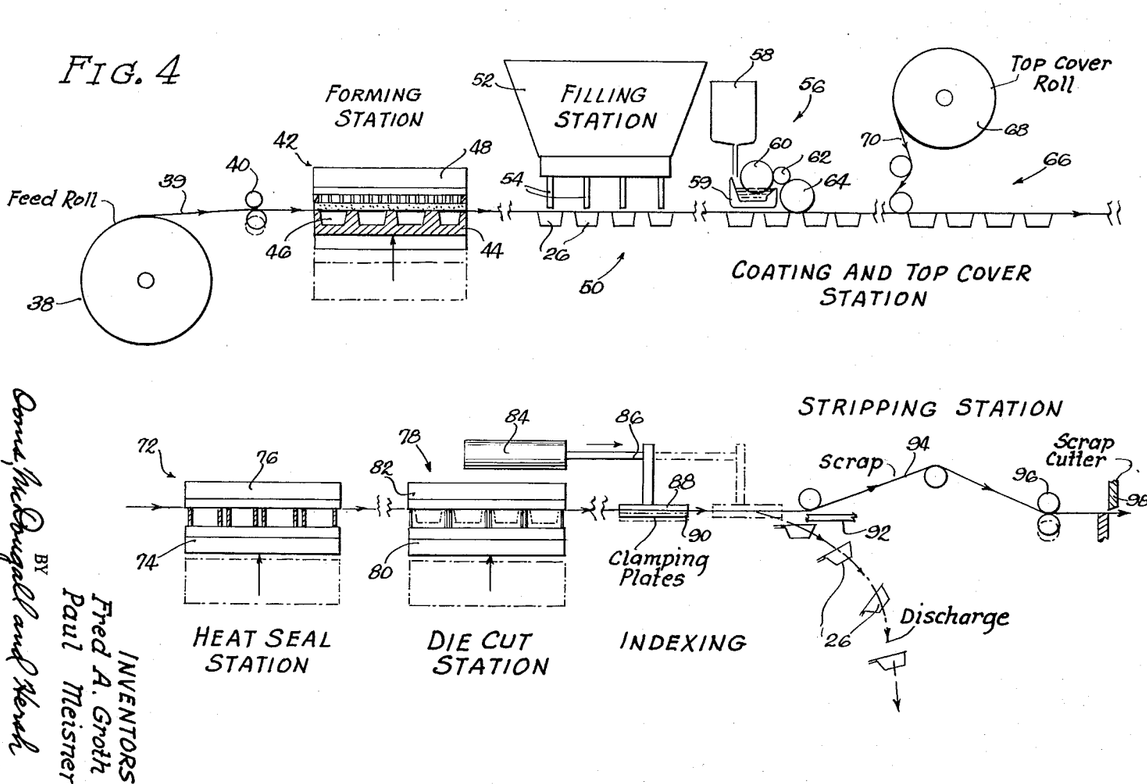
FIGURE 4 is a diagrammatic view illustrating the sequential steps carried out in the operation of the machine of this invention.

FIGURE 4 illustrates diagrammatically the various sequential steps carried out within the machine. The operation of the machine is such that the package 26 shown will pass from the chute 20 in a completely final form without the necessity for any further trimming, sealing or other finishing operations. The diagrammatic illustration and the subsequent detailed description will be made with reference to the production of packages similar to the cups 26. However, it will be apparent that many varieties of shapes and sizes can be employed by simply changing the forming die design and by providing a modified loading means for various goods. The packages 26 shown are particularly suitable for goods such as candy, small hardware items and articles of this nature. The loading device to be described is designed for goods of this size and shape. However, it will be apparent that certain modifications in the loading device within the spirit of this invention can easily be made to provide for other articles. Similarly, other novel characteristics of this invention can be modified once the inventive concepts herein disclosed are appreciated.

Referring to FIGURE 4, a roll 38 of plastic or other material 39 having characteristics suitable for use in the manner to be described is adapted to be fed into the packaging machine. Beyond the feed rollers 40 there is provided a forming station 42 which includes a lower vertically movable mold 44 having cavities 46 corresponding to the desired package shape. An upper stationary member 48 is provided for engagement with the mold 44 during the forming operation.

Adjacent the forming station there is provided a loading station 50 for filling the containers 26. The goods to be packaged are located in a hopper 52 and are adapted to be delivered through delivery tubes 54 for filling of the packages.

The next station illustrated is the coating station 56, which includes an adhesive supply 58 for the tray 59. Pick-up roll 60, transfer roll 62 and applicator roll 64 are adapted to cooperate whereby the adhesive is passed to the upper surface of the cups passing by this station.

Package closure station 66 is located immediately beyond the adhesive coating station. A roll 68 of flat plastic sheet material 70 is located at this station whereby the plastic sheet can be brought into engagement with the adhesive coated rims of the cups 26.

The closure for the cups 26 is sealed at the station 72. During the sealing operation a vertically movable lower platen 74 is adapted to move up into engagement with an upper stationary platen 76. Application of heat at this time accomplishes the desired sealing effect.

Following sealing the packages are transferred to die cutting station 68 wherein a vertically movable lower die 80 moves into engagement with the packages. Cutting means located in the die 80 serve to separate all but a small portion of the sealed cups from the associated plastic web. A heated platen 82 is provided for softening the plastic for cutting and in order to provide a back-up for the cutting blades.

In the machine operation indexing means are provided for moving the plastic web through the machine. The indexing means generally include a cylinder 84 having piston 86 operatively connected to clamping plates 88 and 90. The lower plate 90 is provided for vertical movement into clamping engagement with the upper plate 88, and the piston 86 in a forward stroke is adapted to move the plates and clamped web to the dotted line position shown.

Stripping means 92 are located immediately beneath the path of the plastic web. The stripping means essentially comprise an abutment means whereby complete separation of the formed cups can be accomplished for discharge from the machine. As noted, the cutting operation does not completely sever the packages from the web. However, the stripping means 92 accomplishes final seperation since the packages will tear away from the web upon engagement with the stripping means.

The web, after seperation from the packages, comprises scrap material 94 which is transferred to exit rollers 96. A scrap cutter 98 can be provided beyond the exit rollers for cutting the scrap into smaller pieces.

The operation of the machine of this invention will become more apparent when considering in detail the various stages of the machine. It is important to note, however, that the machine operates by means of a cycle which includes a precisely timed indexing step. Specifically, the machine is adapted for an automatic operation wherein a predetermined length of plastic material is indexed into the machine at a predetermined time interval and various machine operations occur within this time interval. It is also important to note that the various operations occur simultaneously on different sets of the cups 26. Thus, while a set of cups is being formed at the station 42, a preceding set is being filled, another set is being sealed, etc. The adhesive coating occurs during the actual indexing operation while the plastic sheet is moved beneath the applicator roller 64. Similarly, the indexing operation of this invention operates whereby the closure sheet 70 is drawn over a set of cups during the indexing movement.

Package forming

Figure 5:
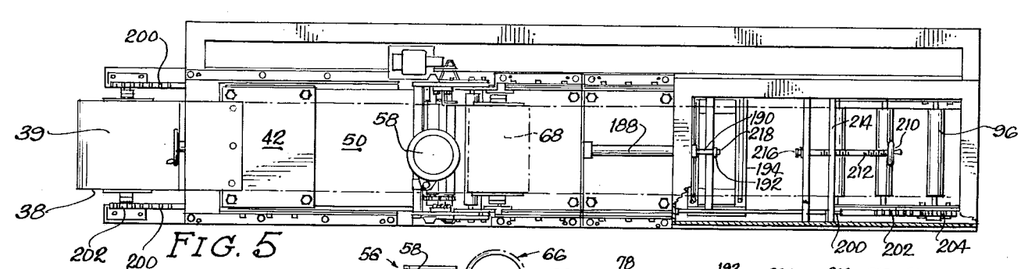
FIGURE 5 is a plan view of the packaging machine with the housing removed.
Figure 6:
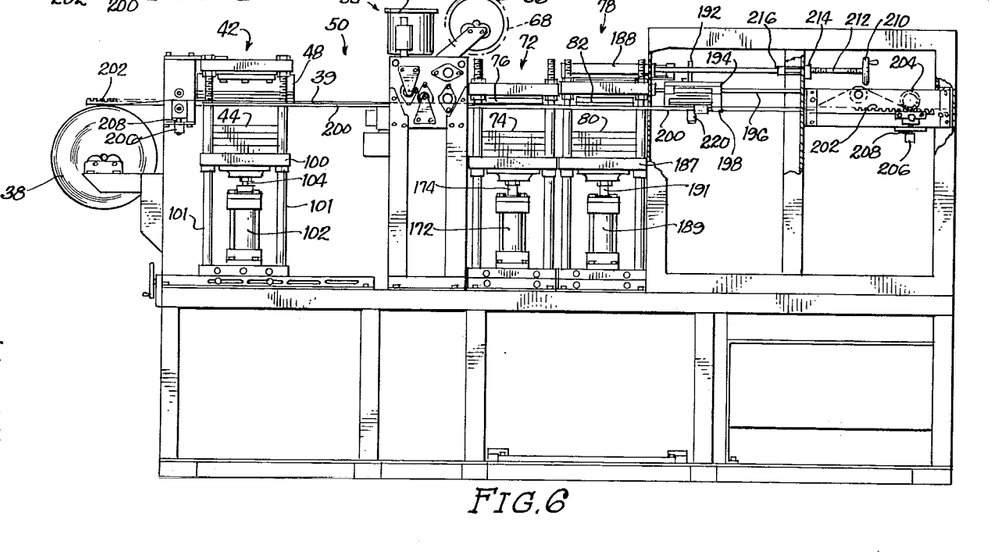
FIGURE 6 is a side elevation of the packaging machine with the housing removed.
Figure 7:
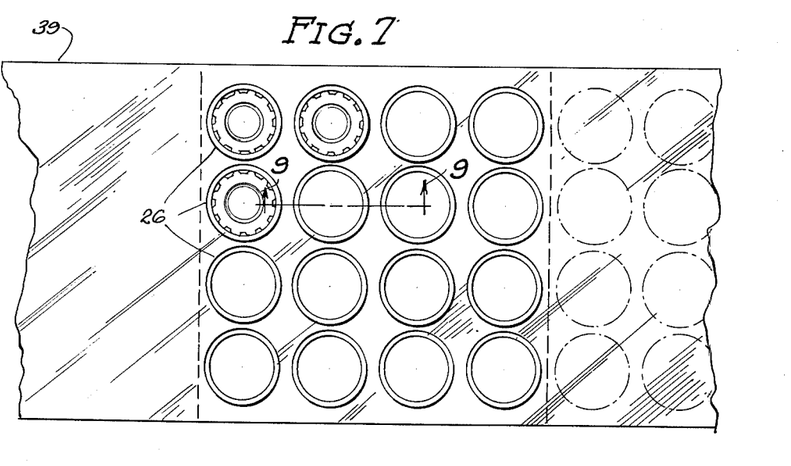
FIGURE 7 is a detail plan view of the plastic sheet used in the package formation as it appears at the forming station.
Figure 8:
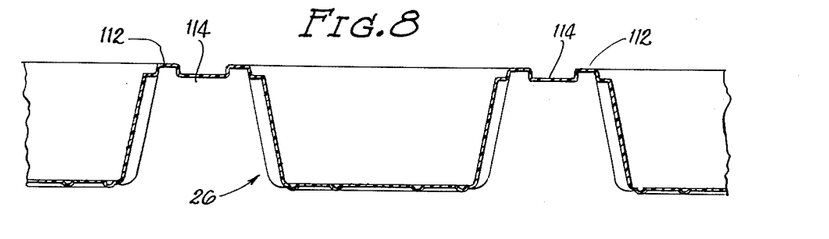
FIGURE 8 is an enlarged elevational view of the plastic sheet after formation of the cups therein.
Figure 9:
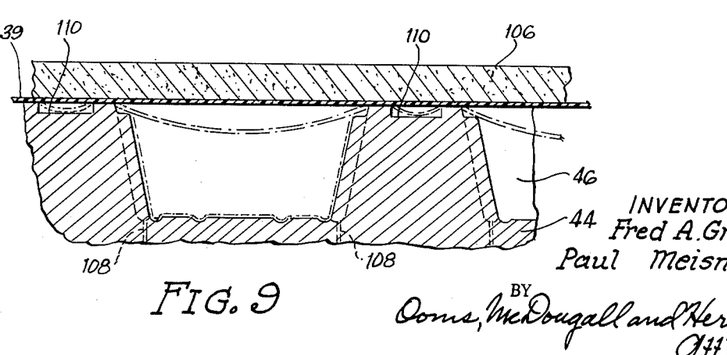
FIGURE 9 is an enlarged detail elevation taken about the line 9—9 of FIGURE 7.

A detailed description of the forming operation can be provided in connection with FIGURES 7 through 9 and by reference to the composite structure shown in FIGURES 5 and 6. In the forming stage a plastic sheet 39 is fed to the station 42 wherein there is located the platen 100. The platen is located on supporting rods 101 and is adapted to be vertically moved by means of the cylinder 102 and the piston 104. Female die 44 is secured to the platen 100 whereby the die can be moved into engagement with the plastic sheet.

The upper stationary die member 48 is provided with heating coils for softening the plastic material. The die in accordance with a conventional technique includes a porous metal platen 106 which is positioned in contact with the plastic sheet during the forming operation.

The forming is carried out by first moving the die 44 into engagement with the plastic sheet. Air pressure is applied to the sheet through ports 108 located in the die 44, and this pressure serves to force the sheet against the heated platen 106.

To complete the forming operation, air pressure is applied to the film through the porous platen 106 forcing air from the cavities 46 through the ports 108. The heated plastic film will thus be forced into the cavities 46 and will assume a form corresponding to the cavity design. Prior to parting of the dies, substantially all of the air is exhausted from the cavities 46 through platen 106. A small amount of air is permitted to remain within the cavity in order to facilitate parting of the die and formed receptacles.

It will be noted that the die 44 is provided with annular depressions 110 surrounding the cavities 46. With this die design, channels 114 are formed in the cuplike members 26 between adjacent raised rims 112. As will become apparent, this particular die design plays an important role in the final product.

Filling operation

The filling of the cups 26 is accomplished by a loading mechanism stationed at the position 50 (FIGURES 4 through 6). The loading mechanism is shown in detail in FIGURES 10 through 12 and includes a frame 115 supporting a hopper 52 and a feeding mechanism 116. Vibrating means 118 is also located on the frame whereby the goods in the hopper and feeding mechanism can be transferred in the manner to be described.

Figures 10, 11, 12:
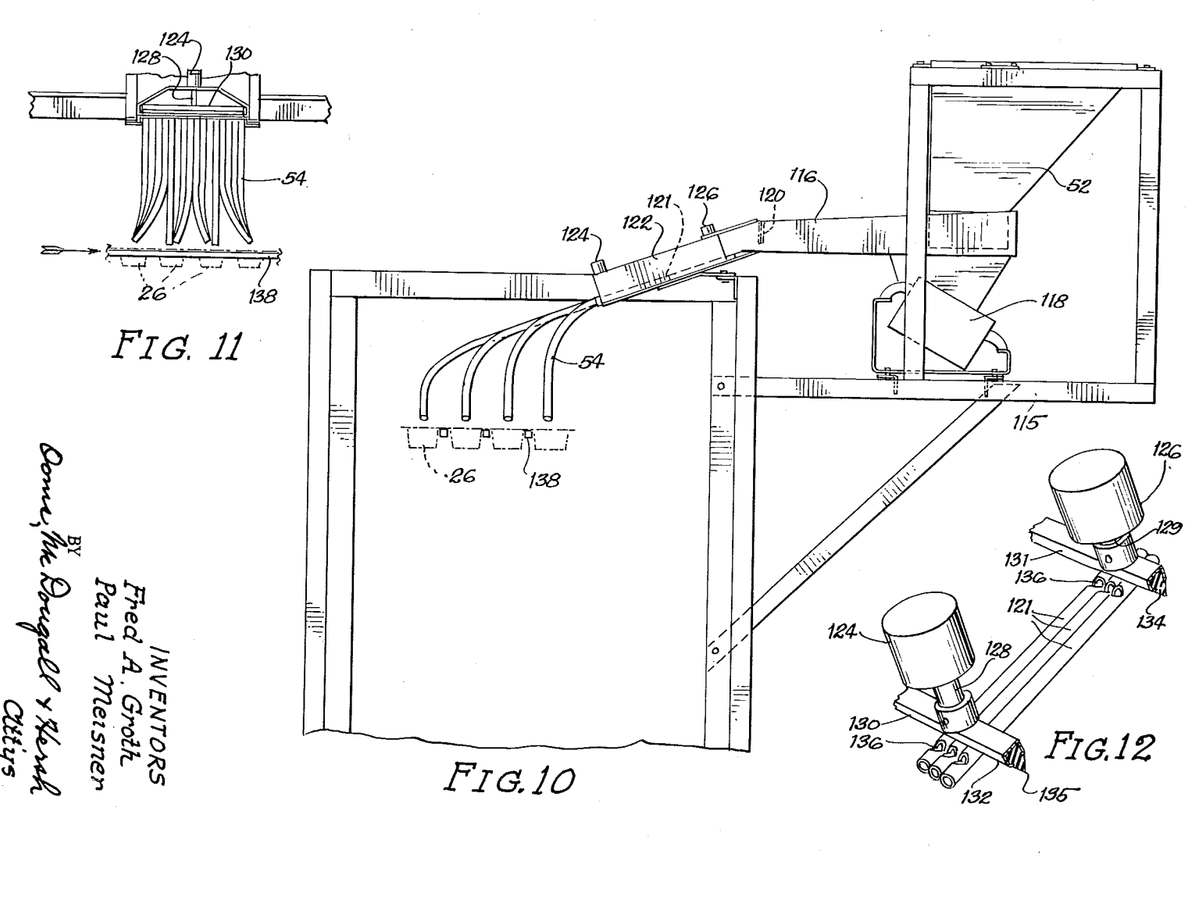
FIGURE 10 is an elevational view of the loading mechanism for the packages as it appears looking from the discharge end of the machine.
FIGURE 11 is a side elevation of the loading mechanism shown in FIGURE 10.
FIGURE 12 is a detail perspective view of the stop mechanism employed in the operation of the loading mechanism.

A barrier 120 extends across the end of the feeder 116. The barrier is spaced from the bottom of the feeder and it serves to size goods passed out of the feeder. Thus, if any of the goods are oversize or connected together in any manner, the barrier 120 will prevent passage out of the feeder.

At the end of the feeder there is provided a pre-load chamber 122. This chamber has positioned therein a plurality of channels 121 which terminate in tubular delivery means 54. The channels 121 conform in size to the tubes 54 and can actually comprise extensions of these tubes.

Cylinders 124 and 126 and associated pistons 128 and 129 are operatively connected to stop blades 130 and 131 positioned at either end and aligned transversely across the channel members. Each of the stop blades comprises an elongated U-shaped member 132 having inturned ends for securing elongated member 134. The member 134 is provided with a pointed edge 135 and is preferably formed of a soft rubber material. Notches 136 are formed in the top surface of the channels 121 at either end thereof and the notches are aligned beneath the respective stop blades. It will be apparent that operation of the cylinders 124 and 126 will result in movement of the stop blade members 134 into the notches 136. Goods to be delivered cannot be transferred when the blades are in the down position and, therefore, the blades serve as closing means for the channels. By using a soft rubber material for the member 134, the blades will not damage the goods being packaged.

In the operation of the filling mechanism, the formed cups 26 are first positioned beneath the delivery tubes 54. The cups can be supported by means of rails 138. Goods are delivered to each of the formed receptacles comprising the cups 26 and in the preferred form of this invention, a delivery tube 54 is provided for each cup formed in a given forming operation.

The loading mechanism illustrated is characterized by a pre-load step carried out prior to delivery of the goods to the formed cups. In the pre-loading operation, cylinder 126 is operated to provide communication between the feeder 116 and the channels 121. The cylinder 124 is operated to close off communication between the channels 121 and the delivery tubes 54. Operation of the feeder 118 will serve to deliver the goods into each of the channels 121 and since the channels are identical in size, an exact amount of goods will be delivered to each channel. After the channels have been filled, cylinder 126 is operated to close the end of the channels and when the cups 26 are in position, cylinder 124 is actuated to open the channels whereby a metered quantity of goods is delivered to each of the individual cups.

*Adhesive coating and package sealing*

Figure 13:
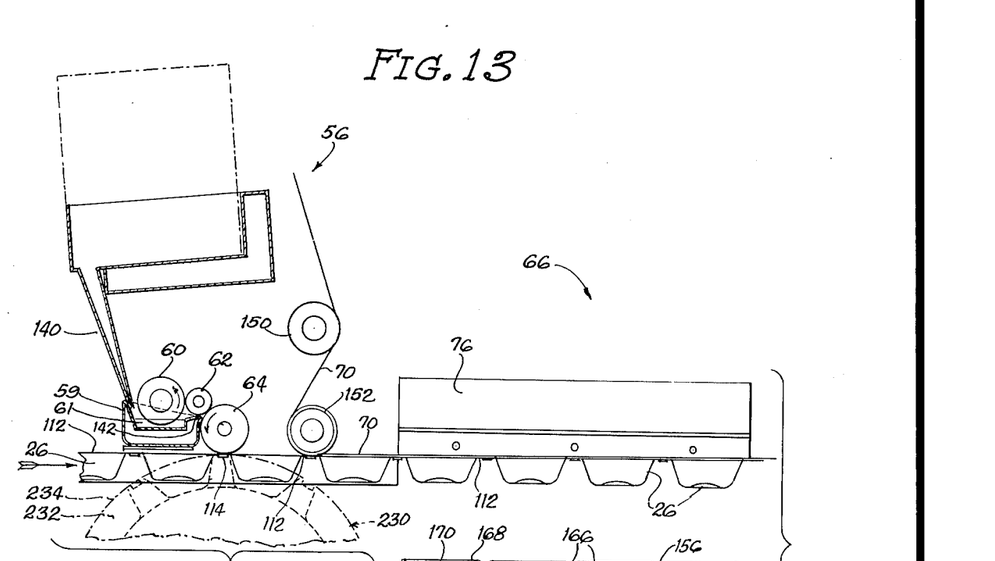
FIGURE 13 is a diagrammatic side elevation of the adhesive coating and package closing mechanism of this invention.
Figure 14:
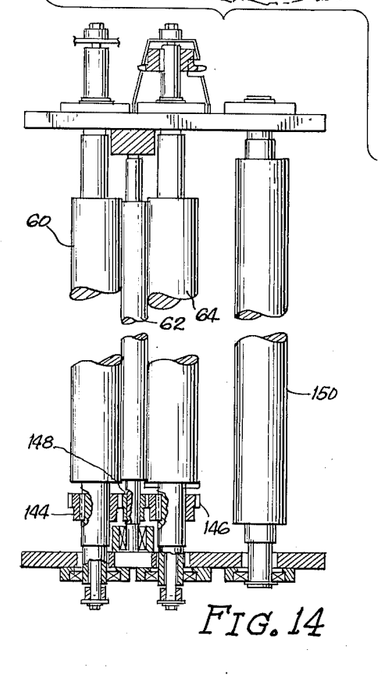
FIGURE 14 is a detail plan view of the adhesive coating roller arrangement.

The filled cups are provided with an adhesive coating at the station 56 and following this a closure is provided for the packages at station 66. Referring to FIGURES 13 and 14 there is shown an adhesive container 58 having a delivery tube 140 for passage of adhesive to tray 59. The container 58 and the tray 59 may be heated in order to maintain the consistency of the adhesive material.

A pick-up roll 60 is adapted to rotate whereby the periphery thereof will pass through the liquid adhesive 61. A transfer and doctoring roll 62 is provided adjacent to the roll 60. The roll 62 serves to pick up adhesive from the roll 60 and the position of this roll with respect to the roll 60 determines the thickness of adhesive which is passed to applicator roll 64. The adhesive thickness on the surface of the roll 64 can be further maintained uniform depending on the spacing between this roll and the rim 142 on the tray 59. The applicator roll 64 contacts the raised rim of the formed cups and applies adhesive thereto.

The amount of adhesive in the tray 59 is preferably kept relatively constant, and well known metering means can be employed for delivering the adhesive through the tube 140.

The driving arrangement for the rolls is shown in FIGURE 14. Drive gears 144 and 146 are secured to the shaft of rolls 60 and 64 and an idler gear 148 is secured to the shaft of roll 62. It will be apparent that connection of one of the gears 144 and 146 with a motor will provide for operation of the other rolls. The drive means for these rolls operates continuously during the machine cycling and the actual application of adhesive occurs while the formed cups are moving between stations. While the cups are at rest the applicator roll simply maintains a uniform thickness of adhesive on the rim portions immediately beneath it. However, it is preferred to rest the formed cups whereby the channel 114 is beneath the roll 64 whereby a minimum contact between the roll and the raised rim results.

At the package sealing station a second continuous plastic sheet 70 is passed over idler roll 150, over the roll 152 and into engagement with the adhesive coated rim 112. The engagement between the sheet 70 and the rim 112 occurs while the formed cups are moving between stations. As will appear during operation of the indexing mechanism, clamping means serve to pull the formed cups through the machine and the sheet 70 is pulled along during this movement.

At the station 66 the formed cups with the engaged sheets 70 are located between an upper stationary platen 76 and a lower platen 74. The lower platen 74 is secured by means of bolts 154 to a supporting means 164. The bolts are located in oversize holes 156 in the platen whereby a small amount of relative movement between the platen and the supporting means can be accomplished. The platen is also spaced from the supporting means and compression springs 160 are located at several points to urge the platen away from the supporting means. The described means for positioning the platen 74 function to improve contact between the platen and the formed cups during the sealing operation. Any slight differences in configuration or in the positioning between various sets of cups can be compensated for by means of the ability of the platen 74 to adjust itself. More uniform sealing will result.

A plurality of cylinders 166 are located on the platen 74. The cylinders are provided with a beveled annular edge 168 which fits around the formed cups. A sponge-like insert 170 is positioned centrally of each of the cylindrical members and this insert along with the edges 168 serve to urge the cups into engagement with the upper platen 76. This will, of course, occur when the cylinder 172 and its associated piston 174 (Figure 6) operate to move the lower platen upwardly. The upper platen 76 is provided with heating means adapted to operate during the sealing operation.

Figure 19:
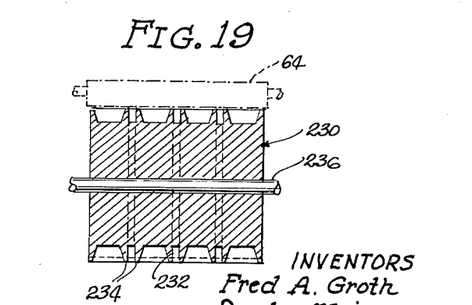
FIGURE 19 is a sectional view of a pressure applying device employed in the adhesive application.

FIGURE 19 illustrates a drum 230 which may be employed in the adhesive applying operation to insure uniform pressure between the application roll 64 and the rims 112. Cavities 232 are provided on the drum surface and the annular edges 234 thereof are adapted to encompass the cups 26 and fit beneath the rims 112 whereby the rims will be supported at all times during contact with the roller 64.

The axis 236 is located perpendicular to the direction of movement of the sheet 39 and drive means for the drum can be provided whereby the drum speed is synchronized with the sheet indexing speed. Accordingly, each succeeding row of cups 26 will register with a cavity 232.

The annular edges 234 are to be contoured to provide for registry with the roll 64 while adhesive is applied to the rims 112. In the illustrated embodiment, the edges 234 present a curved contour corresponding to a circle generated about the drum axis. The edges 234 may be of a flexible material to provide a resilient pressure applying surface and the axis 236 of the drum 230 can be vertically adjustable for variations in the pressure.

*Die cutting operation*

Figure 15:
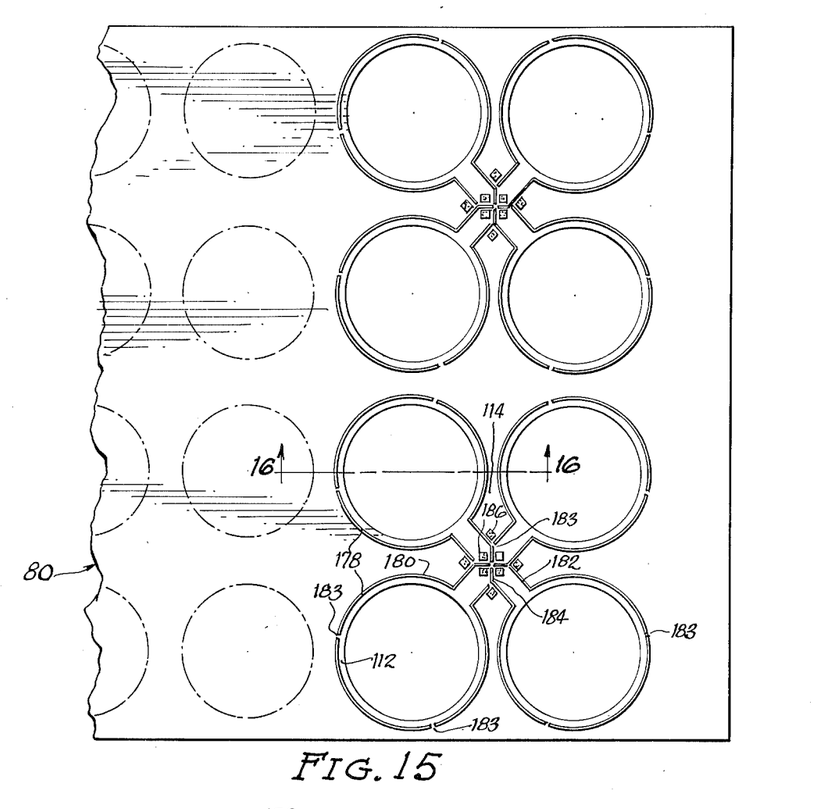
FIGURE 15 is a plan view of the cutting die employed in the packaging machine.
Figure 16:
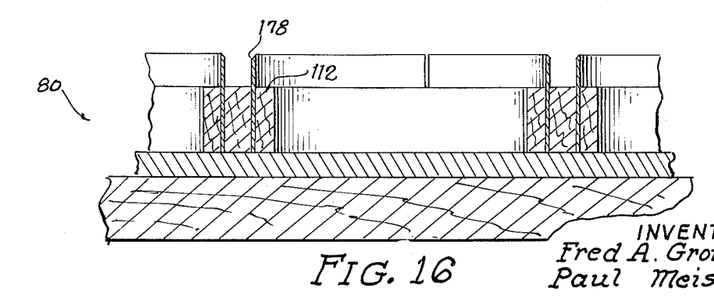
FIGURE 16 is a detail sectional view taken about the line 16—16 of FIGURE 15.

The die 80 shown in FIGURES 15 and 16 is employed for cutting the final outline of the cups 26 whereby they can be ultimately separated from the plastic web. In the specific embodiment described wherein sixteen cups are formed in a single forming operation, the die 80 is designed for cutting sixteen cups simultaneously.

Cutting edges 178 are provided in the die and the edges include a circular portion 180 and a rectangular portion 182. The cutting edge is provided with discontinuities 183 in its periphery in order to leave uncut areas whereby the cups will not be completely separated from the web. As illustrated, additional discontinuities occur in the area near the rectangular portions 182. The rectangular portinons in the cutting edge serve to form the tabs 34 and 36 illustrated in FIGURES 2 and 3. The open space between the tabs is provided due to the fact that the rectangular portion of the cutting edge extends beyond the rims 112 of the cups into the area of the channel depressions 114. Since the plastic sheets are not sealed in the area of the depression, the tabs will be separated and a simple means for opening the sealed container is provided.

Due to the discontinuities in the cutting edge, the cups 26 will be retained by the plastic web and carried past the die cutting station. The cups are stripped from the web when they reach abutment means such as that shown at 92 in FIGURE 4. Since the discontinuities in the cutting edge are small, the cups easily strip away from the web. The cutting edges may be provided with inturned ends 184 in order to provide the tab design illustrated.

In a preferred form of this invention, the cutting die is provided with sponge or foam rubber inserts 186. The inserts are positioned about the rectangular portions 182 of the cutting edge whereby the plastic sheets will be urged upwardly when the cutting die is moved into position during the cutting operation. These inserts are particularly important when the cutting die is withdrawn, since they prevent pulling away of the tab portions from the web. Thus, the resilient inserts offset the frictional contact of the cutting edge with the plastic tab portions.

As illustrated in FIGURE 6, the cutting die 80 is mounted on a vertically movable platen 187. The platen 187 is raised whereby the cutting die is pressed against the plastic sheet during the die cutting operation. Cylinder 189 and associated piston 191 serve to vertically move the cutting die. It is contemplated that a "floating" die mounted in the same manner as the lower heat sealing die member 74 can be used for the cutting edges. This type of die will permit more accurate cutting and will serve to reduce the number of defective packages.

*Description of indexing operation*

As previously indicated, the machine of this invention is adapted to index the plastic web and the cups formed therein at predetermined times during the operation of the machine. The indexing is accomplished through the operation of cylinder 188 and associated piston 190 (FIGURES 5 and 6). The piston 190 is secured by means of the upstanding bar 192 which, in turn, is secured to the clamping mechanism bracket 194. The bracket 194 is reciprocally movable on rods 196.

Figure 17:
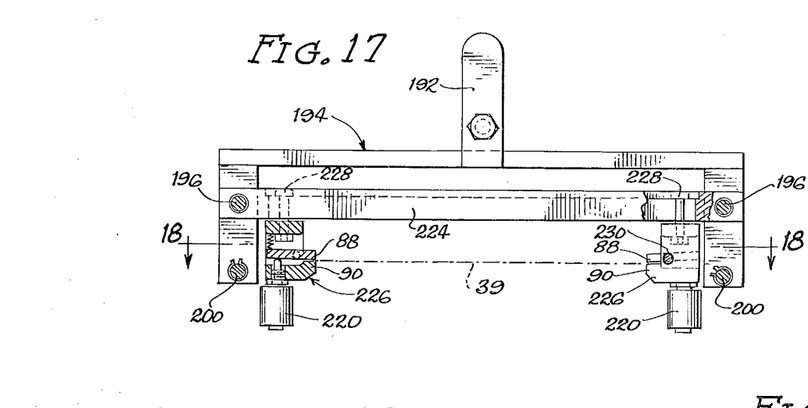
FIGURE 17 is a cross-sectional view illustrating the clamping mechanism included in the indexing operation.
Figure 18:
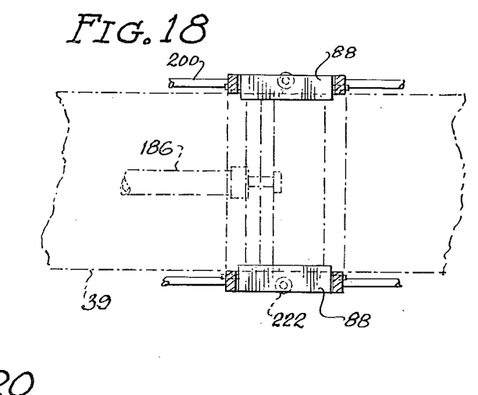
FIGURE 18 is a plan view of the clamping mechanism shown in FIGURE 17.

The clamping mechanism associated with the bracket 194 is shown in detail in FIGURES 17 and 18. This mechanism is adapted during an indexing cycle to clamp each side of the plastic web and to carry the web toward the discharge end of the machine in response to the forward stroke of the piston 190. At this point, the clamping mechanism will release the sheet whereby the bracket 194 can be returned to the position shown.

Also secured to the bracket 194 at the point 198 are tie rods 200. The tie rods extend approximately the whole length of the machine and are provided with rack teeth 202 at either end. Drive pinions are adapted to engage these teeth, and the drive pinions are operatively connected to the rollers at the entry and discharge ends of the machine. The pinion 204 at the discharge end of the machine is mounted co-axially onto the shaft of the upper exit roller 96, while a similar pinion (not shown) is secured to the upper roller 40 at the entry end of the machine.

Cylinders 206 and associated pistons 208 are located at the entry and discharge ends of the machine and are operatively connected to the lower rollers 40 and 96. When the pistons 208 raise the lower rollers, they are adapted to press the plastic sheet against the upper roller whereby the sheet will be carried by the rollers when they are rotated. Since the clamping bracket 194 is secured to the tie rods 200, the forward stroke of the piston 190 will result in movement of the forward and rearward rack and pinion combinations. The piston 208 is adapted to be in the upward position during this forward stroke and, therefore, the plastic sheet is carried by the rollers at the same time the clamping means carries the sheet forward.

A hand wheel 210 is provided for adjusting the distance of the indexing stroke. Thus, in situations where the size of the forming die and, accordingly, the length of the plastic sheet used up during forming is to be changed, the distance of movement of the plastic sheet during the indexing can be changed. In the position shown, the machine is set for a maximum indexing distance. If the hand wheel 210 is rotated, the shaft 212, threaded in cross bar 214, will move to the left. The end 216 of the shaft comprises an abutment means which forms a positive stop for the end 218 of the piston 190 whereby the piston stroke can be limited. It is contemplated to provide a limit switch adapted to be actuated when the piston has moved the desired distance in its forward stroke. This switch is preferably actuated just prior to contact of the ends 216 and 218 and serves to initiate machine operations, in particular raising of the forming die, which occur after completion of the indexing. The position of the limit switch can be tied in with movement of the shaft 212 and the abutment end 216 will serve to stop the stroke of the piston.

Referring to FIGURES 17 and 18, there is shown in detail the clamping mechanism associated with the bracket 194. The mechanism includes an upper stationary cross member 224 forming part of the bracket 194. Fixtures 226 are secured to the member 224 by means of the bolts 228 and upper clamps 88 are rotatably mounted by means of the pins 230 in the fixtures. It will be apparent that operation of the cylinders 220 will result in rotation of the plates 88 in opposition to the springs 232 and clamping of the web 39. The lower clamp 90 is illustrated as a continuation of the fixtures 226.

*Typical operating cycle*

In beginning the operation of the disclosed apparatus, the plastic sheet 39 must first be pulled by hand through the machine. It will be appreciated that in the initial steps of the machine, the first portions of the plastic sheet will be wasted, since an actual package will not be produced until the formed packages reach the discharge point. Accordingly, the initial operations of the die cutting, sealing and other stages are of no practical consequence. However, after the first few indexing operations, a progression of formed cups will continuously pass through the machine as long as the supply of plastic sheet and goods to be packaged is continued.

Figure 20:
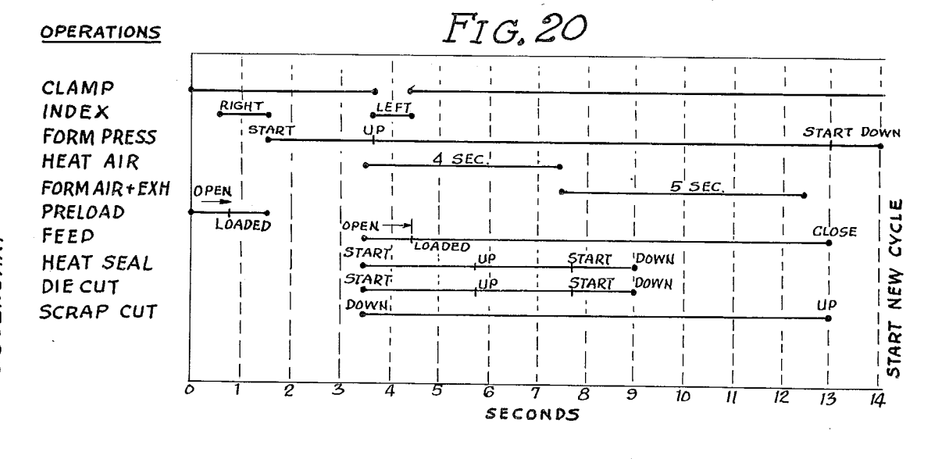
FIGURE 20 is a schematic illustration of an operating cycle showing the order of the various operations and the time involved in a typical cycle.

FIGURE 20 illustrates one complete machine cycle starting with the clamping and indexing and continuing until each of the individual operations has been completed. In the typical operation illustrated, 14 seconds are required, and during this time all of the above described operations occur, although each of the operations is carried out on a different portion of the plastic sheet. Thus, while the forming die is forming new cups, preceding cups are being filled, adhesive is being applied to additional cups, etc.

As illustrated in FIGURE 20, two operations occur at the beginning of the 14 second cycle. The clamp operation illustrated involves operation of the cylinders 220 to clamp the plastic sheet between the clamping plates and operation of the cylinders 206 to clamp the lower rollers 40 and 96 against the plastic sheet. The pre-load operation illustrated involves operation of the cylinder 126 (FIGURE 10) whereby the goods to be packaged are delivered to the pre-load chamber 122. The cylinder 124 holds the stop plate at the end of the pre-load chamber in closed position during this time.

The next operation, which commences after ½ second of the cycle has elapsed, involves indexing of the clamping bracket 194 to the right, this operation taking about one second. Since the clamp operation resulted in clamping of the sheet, the bracket clamping means will carry the sheet forward and the rack and pinion arrangement described will result in the rotation of the exit and entry rollers to aid in the sheet movement.

As soon as the sheet movement is completed, the "form press" operation commences. As illustrated in FIGURE 20, the female die 44 takes about 2 seconds to move into position. The forming operation described takes about 9½ seconds, after which the female die moves vertically downward for about one second.

During the "form press" operation, several other operations take place. The indexing bracket 194 moves to the left and, as indicated, the clamp means are released during this time and, therefore, the sheet is not affected by the movement of the bracket. The "heat air" operation, as illustrated, commences as soon as the die 44 is moved to the upward position. This "heat air" operation corresponds to the described operation wherein air under pressure is forced through the ports 108 in the die 44 to press the plastic sheet upwardly against the platen 106.

The "form air and exhaust" operation commences after completion of the "heat air" operation. This forming operation comprises passage of air under pressure through the porous platen 106 which forces the plastic sheet into the die cavities 46. Air is then exhausted through the porous platen as described.

The "feed" operation can begin at any time after the sheet has been indexed and, in the illustrated example, begins when about 3½ seconds have elapsed. This operation involves raising of the stop blade operated by the cylinder 124 whereby the goods to be packaged are delivered through the tubes 54. Obviously, at the commencing of this operation the stop blade operated by cylinder 126 must be closed.

The "heat seal" and "die cut" operations likewise commence at any time after the right hand "index" operation is completed. In the "heat seal" and "die cut" operations, both involve upward movement of the respective lower dies retaining these dies in position for the designated period and finally return of the dies to the down position. The "scrap cut" operation involves cutting movement of the blades 98.

The above described operation is only typical of a sequence which can be employed when utilizing the machine of this invention. The particular time involved can be varied considerably depending upon the type of forming operation and the nature of the goods being packaged. The sequence described provides for highly efficient operation of the machine. However, the machine can be employed in various other operations. Thus, manual operation of all or part of the sequence can be resorted to if desired.

In considering the above described apparatus, it will be apparent that various unique concepts are employed in the respective stages of the packaging. However, it will be apparent that the individual stages described cooperate to provide a highly efficient means for producing packaged goods.

As previously noted, the packaging machine described can be employed with respect to many different package designs and a great variety of articles can be packaged in accordance with the concepts disclosed. In this connection, it is not intended to limit the packaging material, and it will be understood that the use of the term "plastic" includes all materials capable of being formed and sealed in the manner described.

The material employed for the top cover is not necessarily formed of plastic, since there is no actual forming applied to this sheet. Thus, foil or paper material can be employed, and these can be precoated with adhesive. Although the adhesive applying operation described is highly suitable and cooperates to provide a unique packaged product, it will be apparent that this step can be eliminated if precoated sheets are employed.

It is also contemplated that a welding operation be employed in the closure step. Thus certain materials will seal when subjected to heat and pressure and certain of the novel phases of this invention can be employed in combination with such a welding step. In some instances, perforations or other means for facilitating opening the packages can be employed.

Concerning the loading means for the formed packages, description has been made of vibrating means for directing the goods to delivery tubes from the loading tray, It is contemplated that other mechanical means, such as plungers, be employed for metering the goods into the loading tray and forcing the goods through the delivery tubes. Obviously, the nature of the goods to be loaded will determine to a large extent which variations in the novel loading would be most suitable.

It will be obvious that various other modifications can be made in the above described packaging machine which provide the characteristics of this invention without departing from the spirit thereof, particularly as defined in the following claims.

We claim:

1. A packaging machine including a plurality of stations, means for introducing a first continuous sheet of plastic material and means for periodically indexing said sheet through said stations, said stations including a forming station capable of producing receptacles in said sheet, a filling station adapted to introduce the articles to be packaged into said machine, means for bringing a second continuous plastic sheet into registry with said rims, a heat sealing station including means for pressing said rims and said second sheet together and means for applying heat during said pressing whereby said receptacles are completely closed, a cutting station including means for cutting said sheets around the outer edges of said rims, and means for discharging said closed receptacles from said machine, said means for periodically indexing the sheets through the machine including means for clamping the sheets along their side edges, a bracket for said clamping means reciprocally mounted for movement between a forward position near the discharge end of said machine and a rearward position nearer the entry end of the machine, and means for holding said clamping means in clamping position during forward movement of said bracket and for releasing said clamping means during rearward movement of said bracket.

2. A machine according to claim 1 including entry rollers and exit rollers for said machine, said entry and exit rollers including upper rollers and lower vertically movable rollers, said first plastic sheet being clamped between said entry rollers and portions of said sealed sheets being clamped between said exit rollers when said lower rollers are moved to their upper positions, means for reciprocating said lower rollers between upper and lower positions, said reciprocating means being adapted to operate simultaneously with said holding means for said clamping means whereby the lower rollers are in the upper position when the clamping means are in the clamping position and whereby the lower rollers are in the lower position when said clamping means are released, rack means operatively connected to said bracket, pinions secured to said upper rollers and engaging said rack means whereby movement of said bracket results in corresponding movement of said rack means and rotation of said upper rollers.

3. A packaging machine including a plurality of stations, means for introducing a first continuous sheet of plastic material and means for periodically indexing said sheet through said stations, said stations including a forming station capable of producing receptacles in said sheet, a filling station adapted to introduce the articles to be packaged into said machine, means for bringing a second continuous plastic sheet into registry with said rims, a heat sealing station including means for pressing said rims and said second sheet together and means for applying heat during said pressing whereby said receptacles are completely closed, a cutting station including means for cutting said sheets around the outer edges of said rims, and means for discharging said closed receptacles from said machine, said means for cutting said sheets comprising a vertically movable lower die, a plurality of cutting edges on said die each including a circular portion dimensioned to cut around the rims of said receptacles and a small tab forming portion extending from said circular portion, said cutting edges having discontinuities therein whereby the receptacles are not separated completely from the adjacent sheet portions during the cutting operation.

4. A machine according to claim 3 wherein the number of cutting edges provided corresponds to the number of receptacles formed in the forming operation, and including resilient inserts adjacent the tab forming portions of said cutting edges, said inserts being adapted to retain the cut tab portions in position upon withdrawal of said lower die from the cutting position.

5. A packaging machine including a plurality of stations, means for introducing a first continuous sheet of plastic material and means for periodically indexing said sheet through said stations, said stations including a forming station capable of producing receptacles in said sheet, a filling station adapted to introduce the articles to be packaged into said machine, means for bringing a second continuous plastic sheet into registry with said rims, a heat sealing station including means for pressing said rims and said second sheet together and means for applying heat during said pressing whereby said receptacles are completely closed, a cutting station including means for cutting said sheets around the outer edges of said rims, and means for discharging said closed receptacles from said machine, said sheet sealing station including a plurality of cylindrical members having open tops and mounted on a plate, said members being dimensioned whereby the top edge thereof is adapted to press against the under side of said rims when the cylindrical members are in the upward position, bolts securing said plate to a vertically movable mount, said bolts extending through oversize holes in said plate to permit relative horizontal movement between said plate and said mount, said plate and mount being maintained in spaced apart relation by a plurality of compression springs to permit relative vertical movement between said plate and said mount.

6. A packaging machine including a plurality of stations, means for introducing a first continuous sheet of plastic material and means for periodically indexing said sheet through said stations, said stations including a forming station capable of producing receptacles in said sheet, a filling station adapted to introduce the articles to be packaged into said machine, an adhesive applying station for applying adhesive to the upstanding rims of said receptacles, means for bringing a second continuous plastic sheet into registry with said rims, a heat sealing station including means for pressing said rims and said second sheet together and means for applying heat during said pressing whereby said receptacles are completely closed, a cutting station including means for cutting said sheets around the outer edges of said rims, and means for discharging said closed receptacles from said machine, said adhesive applying station including a rotary supporting means, said supporting means having a plurality of cavities therein dimensioned to receive said receptacles whereby the edges of said cavities extend to the rims of said receptacles, said supporting means being located whereby said cavities register with said receptacles directly beneath the means for applying adhesive whereby said rims are supported during the adhesive application.

7. A packaging machine including a plurality of stations, means for introducing a first continuous sheet of plastic material and means for periodically indexing said sheet through said stations, said stations including a forming station capable of producing receptacles in said sheet, a filling station adapted to introduce the articles to be packaged into said machine, an adhesive applying station for applying adhesive to the upstanding rims of said receptacles, means for bringing a second continuous plastic sheet into registry with said rims, a heat sealing station including means for pressing said rims and said second sheet together and means for applying heat during said pressing whereby said receptacles are completely closed, a cutting station including means for cutting said sheets around the outer edges of said rims, and means for discharging said closed receptacles from said machine, said means for cutting said sheets comprising a lower die including an upper plate portion having a plurality of cutting edges mounted thereon, bolts securing said plate to a vertically movable mount, said bolts extending through oversize holes in said plate to permit relative horizontal movement between said plate and said mount, said plate and mount being maintained in spaced apart relation by a plurality of compression springs to permit relative vertical movement between said plate and said mount.

8. A packaging machine including a plurality of stations, means for introducing a first continuous sheet of plastic material and means for periodically indexing said sheets through said stations including means for clamping the sheets along their side edges, a bracket for said clamping means reciprocally mounted for movement between a forward position near the discharge end of said machine and a rearward position nearer the entry end of the machine, and means for holding said clamping means in clamping position during forward movement of said bracket and for releasing said clamping means during rearward movement of said bracket whereby operations can be conducted on said sheet while it is stationary, said stations including a forming station capable of producing receptacles in said sheet, a filling station adapted to introduce the articles to be packaged into said machine, means for bringing a second continuous plastic sheet into registry with the upper rims of said receptacles, a heat sealing station including means for pressing said rims and said second sheet together and means for applying heat during said pressing whereby said receptacles are completely closed, a cutting station including means for cutting said sheets around the outer edges of said rims, means for discharging said closed receptacles from said machine, and means for initiating said forming, filling, heat sealing and cutting operations after completion of an indexing movement and while said sheet is stationary, said registry of said second sheet, and said discharging operation being conducted during said indexing movement.

9. A machine according to claim 8 wherein a rack extends outwardly from said bracket into engagement with a pinion and wherein said pinion operates to drive rollers adapted to engage said sheets for assisting movement of said sheets through said machine, and means for clamping said rollers into engagement with said sheets during forward movement of said bracket and for releasing said rollers from engagement with said sheets during rearward movement of said bracket.

References Cited by the Examiner
UNITED STATES PATENTS

| | | | |
|---|---|---|---|
| 2,152,101 | 3/1939 | Scherer | 53—28 |
| 2,289,668 | 7/1942 | Mallory | 53—30 |
| 2,546,059 | 3/1951 | Cloud | 53—28 |
| 2,606,412 | 8/1952 | Salfisberg | 53—28 |
| 2,698,046 | 12/1954 | Finke | 156—200 |
| 2,705,579 | 4/1955 | Mason | 53—28 XR |
| 2,712,717 | 7/1955 | Keller | 53—30 |
| 2,813,799 | 11/1957 | Bender | 53—133 XR |
| 2,879,635 | 3/1959 | Brock | 53—28 |
| 2,958,168 | 11/1960 | Vogt | 53—30 |
| 2,970,414 | 2/1961 | Rohdin | 53—30 X |
| 2,972,215 | 2/1961 | Danielzig | 53—195 |
| 2,982,067 | 5/1961 | Dakin | 53—180 |
| 3,000,157 | 9/1961 | Ollier et al. | 53—184 |
| 3,035,382 | 5/1962 | Lemelson | 53—184 |
| 3,054,679 | 9/1962 | Bradford | 53—133 XR |
| 3,068,623 | 12/1962 | Lakso | 53—78 X |
| 3,102,626 | 9/1963 | Hanes | 53—184 X |

FRANK E. BAILEY, *Primary Examiner.*

BROMLEY SEELEY, *Examiner.*